June 20, 1967 D. M. GLENDENNING 3,325,991

CHAIN

Filed Dec. 6, 1963 2 Sheets-Sheet 1

INVENTOR.
DON M. GLENDENNING
BY Robertson & Smythe
ATTORNEYS.

INVENTOR.
DON M. GLENDENNING
BY Robertson & Smythe
ATTORNEYS.

3,325,991
CHAIN
Don M. Glendenning, Huntington, Ind., assignor to The Locke Steel Chain Company, Huntington, Ind., a corporation of Connecticut
Filed Dec. 6, 1963, Ser. No. 328,650
3 Claims. (Cl. 59—35)

This invention relates to link chains and particularly to an improved apparatus for acting on link chains to ensure longer life thereof under adverse conditions.

Link chains are generally made up of a succession of identical links that are hinged together by pintle pins. The links of such chains usually include spaced parallel legs having at one end a tubular bearing portion adapted to receive a pintle pin. The ends of the legs opposite those having the tubular bearing portion are offset a greater distance than the ends having the bearing portion, and these offset ends have aligned pintle receiving holes extending therethrough for the reception of the pintle pin within the tubular bearing portion of the next adjacent link.

When the chain is in use, the tubular bearing portion provides the pivotal action between links, and the offset ends must be restrained from oscillating on the pintle pins because the unit pressure at these offset ends cause excessive wear, lengthening of the chain and effecting its ultimate destruction.

Although many types of connections between the pintle pins and the offset ends of the links are currently employed to prevent oscillatory motion between them, during severe use these connections often become loose, permitting oscillatory motion effecting excessive wear, lengthening of the chain and the shortening of its life.

The principal object of the invention is to provide an apparatus for handling assembled chain which may be provided with or without oscillation restraining means between the pintles and the offset legs, and for acting on the chain in a manner to permanently prevent oscillation of the offset ends of chain links on their pintle pins.

Another object of the invention is to provide such a machine that indexes the chain links past aligned spot welding heads for spot welding the offset link ends to their pintle pins.

Still another object of the invention is to provide such a machine in which means is provided for indexing the assembled chain past aligned welding heads arranged transversely to the path of travel of the assembled chain.

Still another object of the invention is to provide such a machine which is provided with restraining means for maintaining the chain taut as it passes the welding heads.

Another object of the invention is to provide such a machine in which the chain is maintained in positive engagement with a conducting plate while the chain passes the welding heads.

In one aspect of the invention, a frame may include a horizontal table top having a sprocket at one end that is connected to a friction brake means to restrain its motion to a predetermined extent. At the other end of the table top, another sprocket may be located in longitudinal alignment with the first sprocket, and both may be mounted such that their pitch circles are substantially tangent to the table top, so that with a chain riding over and in driving engagement with both sprockets, the portion of the chain between sprockets rests in contact with the table top.

In another aspect of the invention, a ratchet wheel may be fixed to the sprocket not connected to the brake, and a pawl attached to a pivotal lever may be arranged to cooperate with the sprocket so as to index it step-by-step when the pawl means is oscillated.

In still another aspect of the invention, the end of the lever opposite that supporting the pawl means may be connected to a rod attached to a piston within a cylinder mounted on the frame. The arrangement is such that the admission of pressure fluid to one end of the cylinder (a spring may be used in the other end) while exhausting the opposite end causes the pawl means to be indexed and the chain to be given a step-by-step movement over the table top.

In still another aspect of the invention, a section of the table top may be electrically conductive, providing an electrical ground, against which the chain is maintained in an electrically conducting manner by an idle sprocket pivotally mounted on the table top in such fashion that it is caused to mesh with the chain as it passes over the conducting portion of the table top.

In still another aspect of the invention, the table top may support welding head supports on each side of the path of travel of the chain, and they may be arranged for horizontal movement transversely of the chain path as well as vertically. Each support is adapted to have fixed to it a welding head which may include its own reel of welding rod that is fed through the welding head to its active end which, through the adjustment of the support, can be located in close proximity to the chain as it is indexed along its path of travel.

In still another aspect of the invention, a control circuit may be provided for successively indexing the chain past the welding heads such that each pintle pin stops adjacent the transversely disposed welding heads; the welding rod is fed into contact with the pintle heads and links to thereby effect a weld between the two.

The above, other objects and novel features of the invention will become apparent from the following description and accompanying drawings which are merely exemplary.

Figure 1:
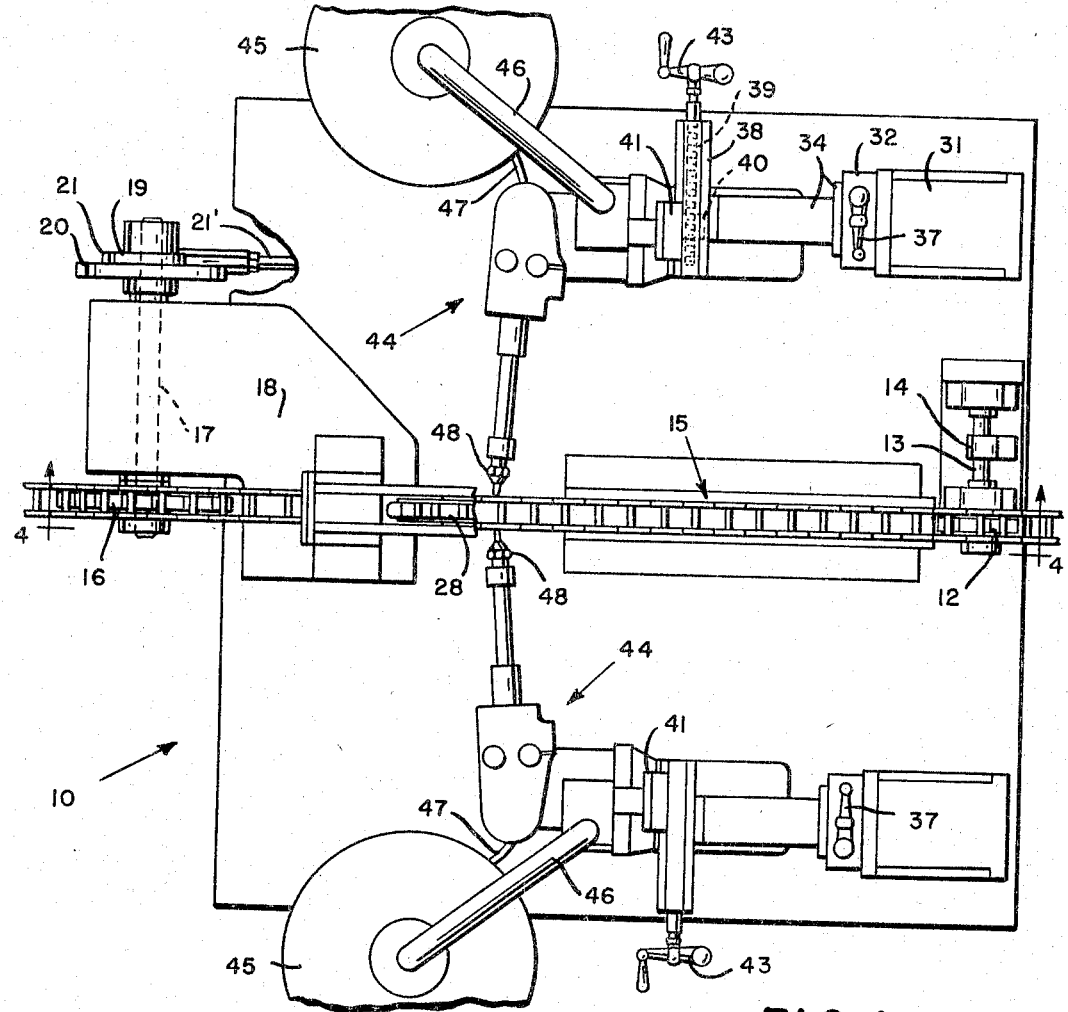
FIG. 1 is a plan view of a machine to which the principles of the invention have been applied.
Figure 4:
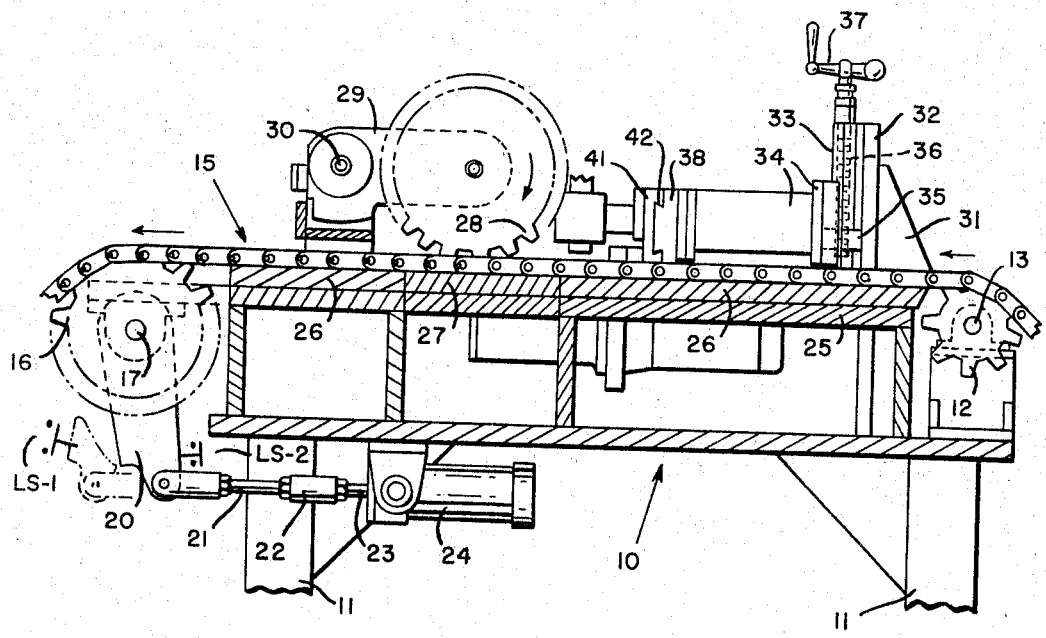
FIG. 4 is a sectional view taken substantially along line 4—4 of FIG. 1.

Referring to the drawings, and particularly to FIGS. 1 and 4, the principles of the invention are shown as applied to a machine including a table top 10 supported by legs 11. A sprocket 12 may be fixed to a shaft 13 at one end of the table top 10. The shaft 13 may have mounted on it a friction-producing device 14 arranged to provide a drag on chain 15 that is pulled along table top 10, as will be described later. The location of sprocket 12 is such that its major portion lies beneath table top 10, and its pitch circle is substantially tangent to the table top 10 so that the driving portion of its teeth are above the table top and capable of meshing with the links of chain 15 as it passes along an upward incline to the table top 10.

A driving sprocket 16 may be mounted on a shaft 17 journaled in a bracket 18 on table top 10 at the end thereof opposite the end where the sprocket 12 is mounted. The sprockets 16 and 12 lie in the same vertical plane, extending longitudinally of table tap 10, and the sprocket 16 is also mounted such that a major portion thereof is below table top 10 and with its pitch circle substantially tangent to the table top 10.

The end of shaft 17 opposite that to which sprocket 16 is connected may have a ratchet wheel 19 fixed to it adjacent a lever 20 that is journaled for oscillation on shaft 17 and supports a pawl 21 for cooperation with the ratchet wheel 19. The lower end of lever 20 is connected to a rod 21' that is connected through a turnbuckle 22 to a piston rod 23. The piston rod 23 extends into a cylinder 24 and supports a piston therein. Admitting pressure fluid to the one end of cylinder 24 while exhausting the opposite end (a spring may be used in the opposite end of the cylinder) oscillates lever 20 and hence indexes sprocket 16 together with chain 15 in a step-by-step fashion. By adjusting the turnbuckle 22, it is possible to adjust the extent of indexing movement of chain 15 for a purpose to be described later.

The table top 10 may be made up of a machinery steel sub-base structure 25 on top of which hardened and ground stock 26 may be mounted for supporting the chain 15. A recess may be formed in the hardened and ground stock within which may be located a hardened brass insert 27, providing a highly electrically conducting portion of the top 10.

Chain 15 may be held in firm contact with the brass insert 27 as it is indexed along the table top 10 by an idler guide sprocket 28 mounted for rotation at the end of an arm 29 mounted for pivotal movement on a shaft 30. The weight of the sprocket 28 and arm 29 maintains electrical contact between chain 15 and brass insert 27, and sprocket 28 accurately guides the chain 15 in its path of travel across insert 27 for a purpose to be described later.

Identical adjustable welding heads and supports therefor are mounted in transverse alignment on table top 10 on each side of the chain 15. Since they are identical, only one will be specifically described. Thus, a bracket 31 may include a member 32 having ways 33 within which may be mounted on element 34 for vertical sliding motion. The element 34 may have a nut portion 35 that has a rotatable but non-axially movable screw 36 threaded thereinto. A crank 37 may be fixed to screw 36 for rotating it in either direction and hence vertically moving element 34 in either direction.

The element 34 may extend toward the sprocket 28 and may include a member 38 at right angles to the member 32 on bracket 31. Member 38 may also support a rotatable, non-axially movable screw 39 that threads into a nut 40 integral with a slide 41 that rides in ways 42 on member 38. A crank 43 may be fixed to screw 39 so that its rotation in both directions causes reciprocation of slide 41 along ways 42.

A welding head 44 may be mounted on the slide 41. It may be a commercial item such, for example, as one sold by the A. O. Smith Company under the trade name "Blitz-Matic" arc spot button welder. It may comprise a reel 45 mounted on an arm 46 for feeding welding rod 47 through the head to an electrode element 48.

There is an identical welding head mounted on an identical slide 41 of an adjustable supporting means on the opposite side of the chain 15 and in transverse alignment. By turning the cranks 37 and 43 for each mounting means, the electrode element 48 of each welding head can be accurately located on each side of chain 15 in alignment with a pintle pin of one of the chain links. Then, by adjusting the turnbuckle 22, the chain 15 can be indexed in a step-by-step fashion so that each pintle pin becomes located in line with the electrode elements 48. The guide sprocket 28 maintains accurate positioning of the links of the chain 15 as they are indexed into position relative to electrode elements 48.

Figure 2:
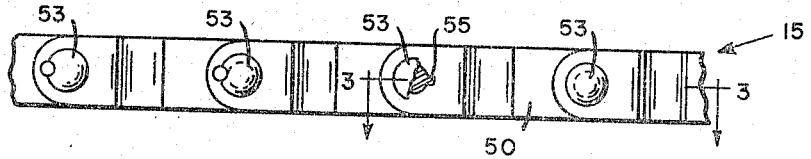
FIG. 2 is an enlarged end elevation of a portion of the chain being treated in FIG. 1.
Figure 3:
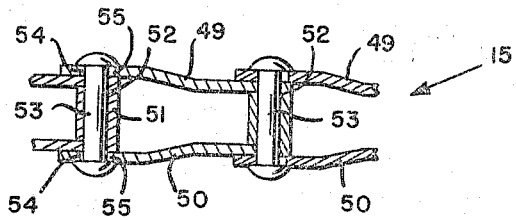
FIG. 3 is a plan view of the chain of FIG. 2.

Referring to FIGS. 2 and 3, each link of chain 15 may comprise legs 49 and 50 joined at their one ends by a tubular bearing portion 51 that is in alignment with holes 52 for receiving a pintle pin 53. The opposite end of legs 49, 50 may be offset so that the distance between them is such as to slidingly receive the non-offset leg end of the next adjacent link. Holes 54 may be provided in the offset ends and may be aligned for receiving the pintle pin 53. The holes 54 may include a key-shaped recess 55 therein for receiving metal of the pin 53 when the latter is staked.

After the staking operation, the remainder of the metal of the pintle pin beyond the offset links may be spun in the usual manner. The previously described operations of staking and spinning may be performed in the production line and the assembled chain fed over table top 10 as previously described. The electrode elements 48 may be adjusted to be in alignment opposite the filled key-shaped recesses 55, and as each index takes place, the next succeeding pintle pin moves into position between nozzle 48. Also, as the welding rod is fed forwardly, contacting the pintle pin, a button weld is performed which ensures permanent non-loosening of the pintle pin 53 in the holes 54 of the offset ends of the legs of each link of chain 15. By welding opposite the recess, upon cooling, there will be at tight joint between the loaded side of the pin and the aperture.

Figure 5:
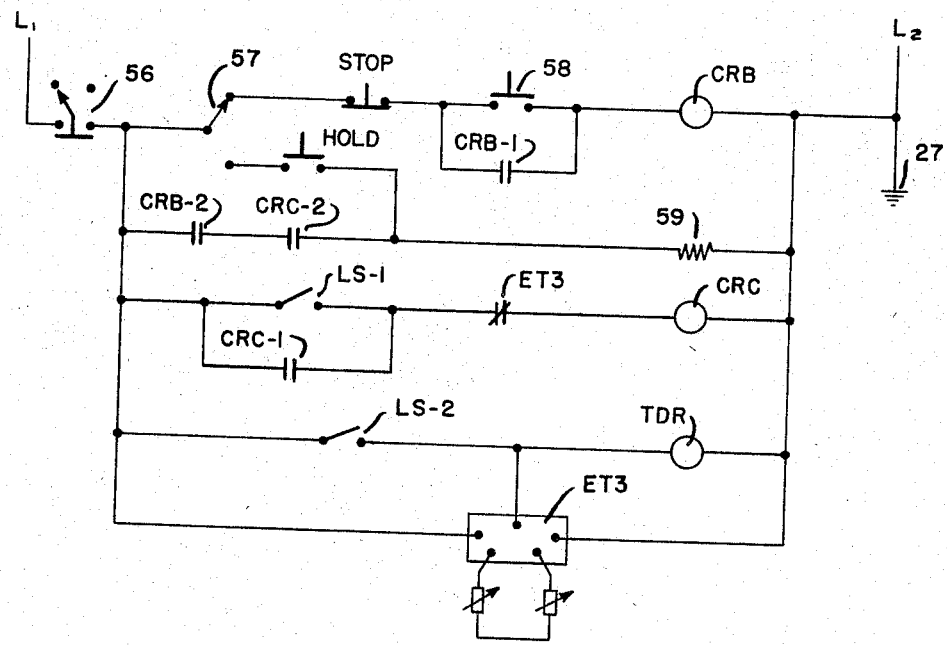
FIG. 5 is a wiring diagram for the machine shown in FIG. 1.

Referring to FIG. 5, closing of control contacts 56 with operating switch 57 in the position shown and closing of push button contacts 58 energize CRB relay, closing CRB–1 holding contacts and CRB–2 contacts. Normally, the spring within the cylinder 24 mountais lever 20 in its dotted line position, closing LS–1 contacts (FIG. 4). Accordingly, turning switch 56 to "on" energizes CRC relay through the closed contacts LS–1, thereby closing holding contacts CRC–1 as well as closing CRC–2 contacts. Closing the CRC–2 contacts with contacts CRB–2 closed as previously described, energizes a solenoid 59 that operates a valve to admit pressure fluid to cylinder 24 to move lever 20 to its solid line position and thus index chain 15 so that the pintle pin of its next succeeding link moves into alignment with electrode elements 48.

Movement of lever 20 to its solid line position closes contacts LS–2, thereby energizing TDR relay as well as an electronic timer ET–3 for a purpose to be described later. After a predetermined time interval, time delay contacts (not shown) close which energizes the circuitry for the welding heads 44 which latter are commercial items and per se form no part of this invention. The circuitry for these welding heads includes electronic timers that control the duration of the cycle of operation including, among other things, the feeding of the welding rod through electrode elements 48, the control of a $CO_2$ gas envelope about the weld, and the control of the water cooling of the heads. The electronic timer ET–3 is set to open contacts ET–3 after the welding operation has been completed, de-energizing relay CRC, opening contacts CRC–2, thereby de-energizing index solenoid 59 permitting the spring in cylinder 24 to return lever 20 to its dotted line position, thus opening contacts LS–2 and closing contacts LS–1. Opening contacts LS–2 de-energizes TDR relay as well as ET–3 relay, the latter closing contacts ET–3 so that with contacts LS–1 again closed, a new cycle is initiated.

Although the various features of the improved machine for treating chain links has been shown and described in detail to fully disclose one embodiment of the invention, it will be evident that changes may be made in such details and certain features may be used without others without departing from the principles of the invention.

What is claimed is:

1. A chain comprising in combination, a plurality of links having side bars with aligned apertures adjacent each end of said side bars; pintle pins extending through said aligned apertures joining a pair of said links, the ends of said pintle pins being adjacent the outer surfaces of said side bars; and a button weld holding each pintle pin to its corresponding side bar so as to prevent rotary movement of said pintle pin relative to its side bar.

2. A chain comprising in combination, a plurality of links having side bars with aligned apertures adjacent each end of said side bars; pintle pins extending through said aligned apertures joining a pair of said links, the ends of said pintle pins being adjacent the outer surfaces of said side bars; and a button weld holding each pintle pin to its corresponding side bar in a restricted area so as to prevent rotary movement of said pintle pin relative to its side bar.

3. The method of assembling link chain made up of links formed of parallel spaced side bars having aligned apertures adjacent each end of said side bars, said method comprising inserting a pintle pin through said aligned apertures; and button welding at least one of ends of said pintle pnis to its corresponding side bar so as to prevent rotary movement of said pintle pin in the aperture of its corresponding side bar.

References Cited

UNITED STATES PATENTS

| | | | |
|---|---|---|---|
| 378,599 | 2/1888 | Legg | 74—251 |
| 1,511,822 | 10/1924 | Belcher | 59—35 |
| 1,826,207 | 10/1931 | Fassler | 219—80 |
| 2,319,979 | 5/1943 | Collins | 74—252 |
| 2,517,497 | 8/1950 | Lavenstein | 59—35 |
| 2,844,042 | 7/1958 | Mercier | 59—8 |
| 2,898,442 | 8/1959 | Anderson | 219—80 |
| 3,125,850 | 3/1964 | Onvlak | 59—8 |

FOREIGN PATENTS 1,016,106  11/1952  France.

CHARLES W. LANHAM, *Primary Examiner.*

G. P. CROSBY, *Assistant Examiner.*